United States Patent
Subramanian et al.

(10) Patent No.: US 8,787,733 B2
(45) Date of Patent: Jul. 22, 2014

(54) SYSTEMS AND METHODS FOR PREVENTING DUPLICATIVE MEDIA CONTENT RECORDINGS

(75) Inventors: Ananthanarayanan Subramanian, Irving, TX (US); Satish K. Singh, Irving, TX (US); Venkata S. Adimatyam, Irving, TX (US); Sachinder D. Reddy, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 482 days.

(21) Appl. No.: 12/842,417

(22) Filed: Jul. 23, 2010

(65) Prior Publication Data
US 2012/0020650 A1  Jan. 26, 2012

(51) Int. Cl.
*H04N 5/76* (2006.01)

(52) U.S. Cl.
USPC .......................................... 386/291

(58) Field of Classification Search
None
See application file for complete search history.

(56) References Cited

U.S. PATENT DOCUMENTS

| | | | | |
|---|---|---|---|---|
| 6,601,074 | B1* | 7/2003 | Liebenow | 348/E7.061 |
| 2002/0191954 | A1* | 12/2002 | Beach et al. | 386/46 |
| 2006/0140584 | A1* | 6/2006 | Ellis et al. | 386/83 |
| 2007/0212019 | A1* | 9/2007 | Kimura et al. | 386/83 |

\* cited by examiner

*Primary Examiner* — William C Vaughn, Jr.
*Assistant Examiner* — Daniel Tekle

(57) ABSTRACT

Exemplary systems and methods for preventing duplicative media content recordings are disclosed. An exemplary method includes a media content access subsystem detecting that a media content instance is scheduled to be recorded, determining, based on an operations log of one or more past operations of the media access subsystem, that the scheduled recording of the media content instance is duplicative of a past recording, and selectively canceling the scheduled recording of the media content instance in response to the determination that the scheduled recording is duplicative of the past recording. Corresponding systems and methods are also disclosed.

19 Claims, 13 Drawing Sheets

| Operation | Program | Date | Time | Recording Type |
|---|---|---|---|---|
| Record | Heroes, Season 2, Episode 13 | 1/15 | 7:00pm | Automatic |
| Delete | AFC Playoffs: NYJ v. DEN | 1/16 | 11:00am | Manual |
| Playback | Seinfeld, Season 1, Episode 7 | 1/17 | 10:00pm | Automatic |
| Delete | Seinfeld, Season 1, Episode 7 | 1/17 | 10:30pm | Automatic |
| Playback | Heroes, Season 2, Episode 13 | 1/18 | 5:00pm | Automatic |
| Record | NBA: LAL v. BOS | 1/18 | 7:00pm | Manual |
| Resume Playback | Heroes, Season 2, Episode 13 | 1/18 | 11:00pm | Automatic |
| Delete | Heroes, Season 2, Episode 13 | 1/18 | 11:45pm | Automatic |
| Record | MacGyver, Season 3, Episode 6 | 1/19 | 4:00pm | Automatic |
| Record | Field of Dreams | 1/20 | 8:00pm | Manual |
| Playback | NBA: LAL v. BOS | 1/21 | 10:00am | Manual |
| Record | Channel 4 News | 1/21 | 7:00pm | Automatic |
| Playback | MacGyver, Season 3, Episode 6 | 1/21 | 10:00pm | Automatic |
| Delete | MacGyver, Season 3, Episode 6 | 1/21 | 11:00pm | Automatic |

Fig. 6

SYSTEMS AND METHODS FOR PREVENTING DUPLICATIVE MEDIA CONTENT RECORDINGS

BACKGROUND INFORMATION

Set-top box devices and other media content access devices are often configured to provide users with access to a large number and variety of media content choices. For example, a user may choose to experience a variety of broadcast television programs, pay-per-view services, video-on-demand programming, Internet services, and audio programming via a set-top box device.

Certain media content access devices include a digital video recording ("DVR") application. In general, media content access devices with DVR applications allow a user to record and then view or otherwise experience recorded media content. For example, a set-top box device may record a particular television program and then allow a user to play back a presentation of the television program in a time-shifted manner. However, media content access devices have a limited amount of storage for media content recordings. In addition, conventional media content access devices have a limited capability of preventing duplicative recording of media content programs. As a result, conventional media content access devices may unnecessarily and/or undesirably occupy their limited storage with media content recordings that are duplicative of recordings a user has already experienced.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers may designate identical or similar elements.

FIG. 6 illustrates an exemplary operations log of the media content access subsystem of FIG. 3 according to principles described herein.

DETAILED DESCRIPTION OF PREFERRED EMBODIMENTS

Exemplary systems and methods for preventing duplicative media content recordings are described herein. As described in more detail below, one or more exemplary systems and/or methods disclosed herein may enable a media content access subsystem (e.g., a set-top box device) to determine that a scheduled recording is duplicative of a past recording and selectively cancel the scheduled recording in response to the determination that the scheduled recording is duplicative. By canceling scheduled recordings that are duplicative of past recordings, the media content access subsystem may preserve its limited storage and/or external storage for non-duplicative media content recordings.

As used herein, "media content" may refer generally to any content accessible via a media content access subsystem. The term "media content instance" refers to any data record or object (e.g., an electronic file) storing, including, or otherwise associated with media content, which may include data representative of a song, audio clip, movie, video, image, photograph, text, document, application file, or any segment, component, or combination of these or other forms of content that may be experienced or otherwise accessed by a user. A media content instance may have any data format as may serve a particular application. For example, a media content instance may include an audio file having an MP3, WAV, AIFF, AU, or other suitable format, a video file having an MPEG, MPEG-2, MPEG-4, MOV, DMF, DivX, or other suitable format, an image file having a JPEG, BMP, TIFF, RAW, PNG, GIF or other suitable format, and/or a data file having any other suitable format.

Figure 1:
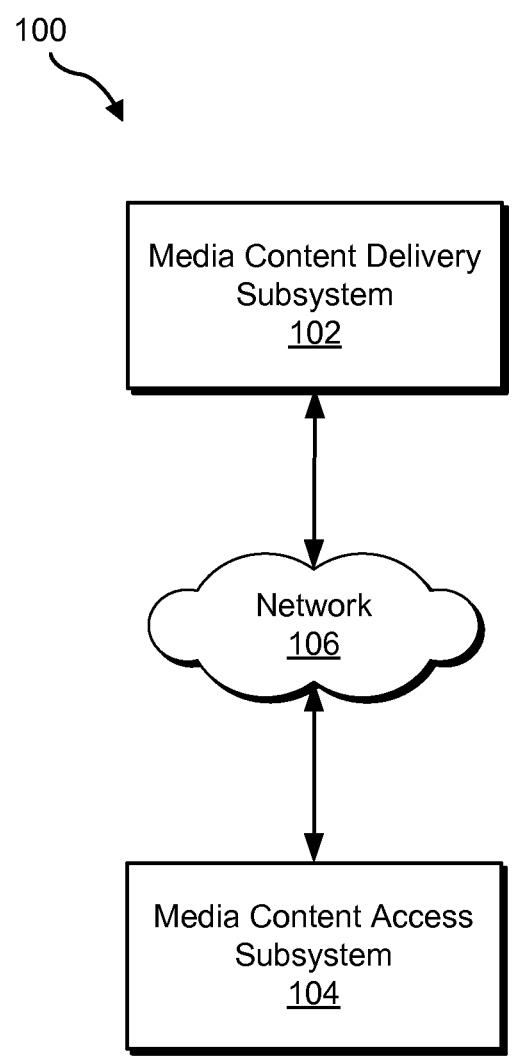
FIG. 1 illustrates an exemplary media content delivery system according to principles described herein.

FIG. 1 illustrates an exemplary media content delivery system 100 (or simply "system 100"). System 100 may include a media content delivery subsystem 102 (or simply "delivery subsystem 102") and a media content access subsystem 104 (or simply "access subsystem 104") in communication with one another via a network 106. Access subsystem 104 may be configured to communicate with and receive a media content stream from delivery subsystem 102.

Delivery subsystem 102 and access subsystem 104 may communicate using any suitable communication technologies, devices, networks, media, and protocols supportive of remote data communications. For example, delivery subsystem 102 and access subsystem 104 may communicate over network 106 using any communication platforms and technologies suitable for transporting media content and/or communication signals, including known communication technologies, devices, transmission media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, radio frequency ("RF") signaling technologies, wireless communication technologies (e.g., Bluetooth, Wi-Fi, etc.), optical transport and signaling technologies, live transmission technologies (e.g., media streaming technologies), media file transfer technologies, in-band and out-of-band signaling technologies, and other suitable communications technologies.

Network 106 may include one or more networks or types of networks (and communication links thereto) capable of carrying communications, media content, and/or data signals between delivery subsystem 102 and access subsystem 104. For example, network 106 may include, but is not limited to, one or more wireless networks (e.g., satellite media broadcasting networks or terrestrial broadcasting networks), mobile telephone networks (e.g., cellular telephone networks), closed media networks, open media networks, subscriber television networks (e.g., broadcast, multicast, and/or narrowcast television networks), closed communication networks, open communication networks, satellite networks, cable networks, hybrid fiber coax networks, optical fiber networks, broadband networks, narrowband networks, the Internet, wide area networks, local area networks, public networks, private networks, packet-switched networks, and any other networks capable of carrying data and/or communications signals between delivery subsystem 102 and access subsystem 104. Communications between delivery subsystem 102 and access subsystem 104 may be transported using any one of above-listed networks, or any combination or sub-combination of the above-listed networks.

While an exemplary system 100 is shown in FIG. 1, the exemplary components illustrated in FIG. 1 are not intended to be limiting. Other hardware environments and implementations may be used in other implementations. Exemplary components of system 100 will now be described in additional detail.

Figure 2:
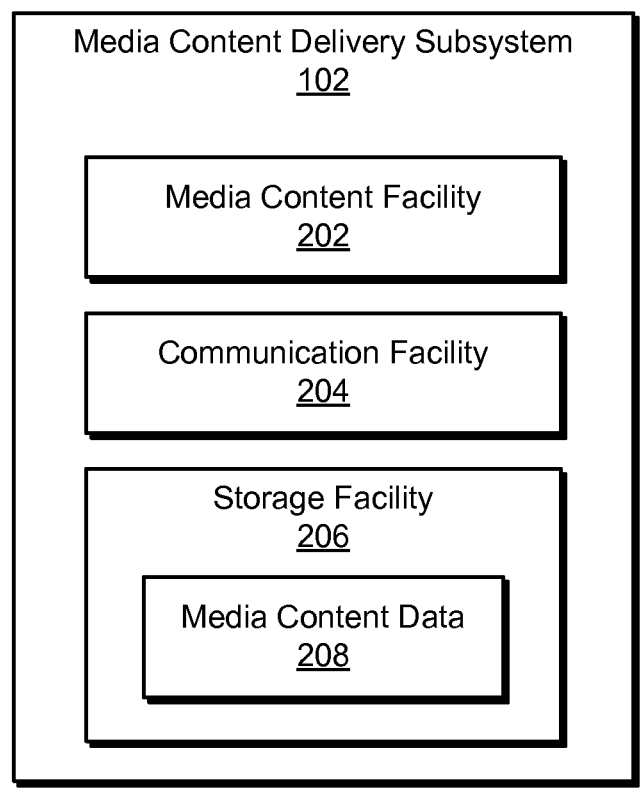
FIG. 2 illustrates exemplary components of a media content delivery subsystem according to principles described herein.

FIG. 2 illustrates exemplary components of delivery subsystem 102. As shown in FIG. 2, delivery subsystem 102 may include a media content facility 202, a communication facility 204, and a storage facility 206, which may be in communication with one another using any suitable communication technologies. It will be recognized that although facilities 202-206 are shown to be separate facilities in FIG. 2, any of those facilities may be combined into a single facility as may serve a particular implementation.

Media content facility 202 may be configured to manage (e.g., maintain, process, distribute, and/or generate) media content (e.g., media content programs, advertisements, television programs distributed in accordance with a television transmission schedule, etc.) configured to be presented to one or more users of access subsystem 104. Media content facility 202 may be configured to manage the media content in any suitable manner as may serve a particular implementation.

Communication facility 204 may be configured to facilitate communication between delivery subsystem 102 and access subsystem 104. In particular, communication facility 204 may be configured to transmit and/or receive communication signals, media content, metadata, and/or any other data to/from access subsystem 104. For example, communication facility 204 may transmit (e.g., broadcast, multicast, and/or narrowcast) data representative of one or more media content instances to access subsystem 104. Such data may be transmitted in one or more media content streams or in any other suitable manner as may serve a particular implementation. Communication facility 204 may be configured to interface with any suitable communication media, protocols, and formats, including any of those mentioned above.

Storage facility 206 may be configured to maintain media content data 208 representative of one or more media content instances. It will be recognized that storage facility 206 may maintain additional or alternative data as may serve a particular implementation.

Figure 3:
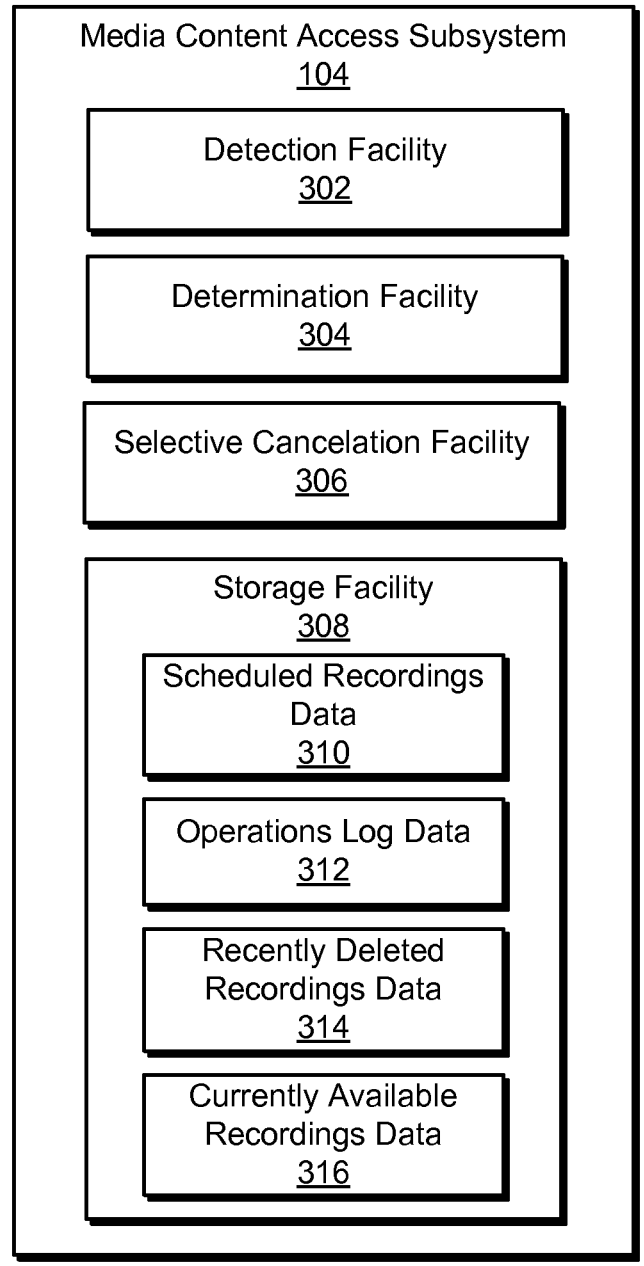
FIG. 3 illustrates exemplary components of a media content access subsystem according to principles described herein.

FIG. 3 illustrates exemplary components of access subsystem 104. As shown in FIG. 3, access subsystem 104 may include a detection facility 302, a determination facility 304, a selective cancelation facility 306, and a storage facility 308, which may be in communication with one another using any suitable communication technologies. It will be recognized that although facilities 302-308 are shown to be separate facilities in FIG. 3, any of those facilities may be combined into a single facility as may serve a particular implementation.

Detection facility 302 may be configured to detect that a media content instance is scheduled to be recorded. Detection facility 302 may be configured to detect the scheduled recording of the media content instance in any suitable manner. For example, detection facility 302 may be configured to detect that a user has scheduled a manual recording of an individual media content instance or that access subsystem 104 has scheduled an automatic recording of one or more media content instances.

As used herein, the term "manual recording" shall include a recording or scheduled recording of an individual media content instance (e.g., a single specific transmission of a television program to access subsystem 104) in response to a user input command to record the individual media content instance. As used herein, the term "automatic recording" shall include a recording or scheduled recording of a media content instance in response to a user input command to automatically record all or any available media content instances in a series of related media content instances (e.g., all or any available episodes of a television program).

Determination facility 304 may be configured to determine that a scheduled recording of a media content instance is duplicative of a past recording. Determination facility 304 may be configured to determine that the scheduled recording is duplicative of the past recording in any suitable manner. For example, determination facility 304 may be configured to determine that a scheduled recording of a media content instance is duplicative of a past recording based on an operations log of one or more past operations of access subsystem 104. In certain embodiments, determination facility 304 may be configured to search the operations log for at least one operation and/or specific type of operation associated with the media content instance scheduled to be recorded (e.g., a recording of the media content instance, a playback of a recording of the media content instance, and/or a deletion of a recording of the media content instance). Based on a detection, within the operations log, of at least one operation and/or type of operation associated with the media content instance scheduled to be recorded, determination facility 304 may be configured to determine that the scheduled recording is duplicative of a past recording, as will be explained in more detail below. Additionally or alternatively, determination facility 304 may be configured to determine that the scheduled recording is duplicative of a past recording based on a listing of currently available recordings and/or a listing of recently deleted recordings, as will be explained in more detail below.

Selective cancelation facility 306 may be configured to selectively cancel a scheduled recording of a media content instance in response to a determination made by determination facility 304 that the scheduled recording is duplicative of a past recording. Selective cancelation facility 306 may be configured to selectively cancel the duplicative scheduled recording in any suitable manner. For example, as will be explained in more detail below, selective cancelation facility 306 may be configured to selectively cancel the duplicative scheduled recording based on the type of the scheduled recording (e.g., manual recording or automatic recording), one or more user-configurable parameters, and/or one or more input commands provided by a user.

Storage facility 308 may be configured to maintain scheduled recordings data 310 representative of one or more scheduled recordings, operations log data 312 representative of one or more past operations of access subsystem 104, recently deleted recordings data 314 representative of one or more recently deleted media content recordings, and currently available recordings data 316 representative of one or more currently available media content recordings. It will be recognized that storage facility 308 may maintain additional or alternative data as may serve a particular implementation.

Figure 4:
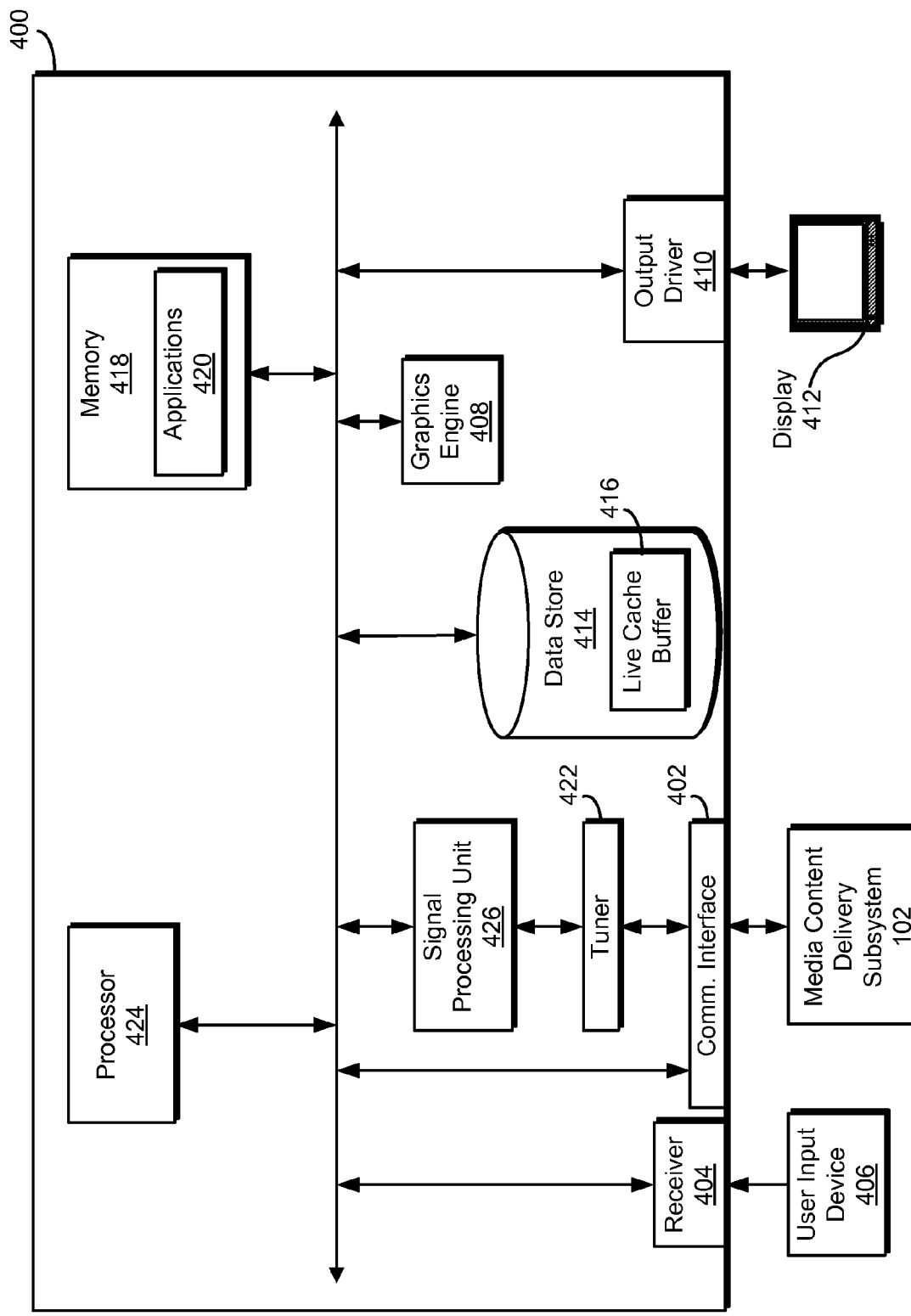
FIG. 4 illustrates an exemplary media content access device having the media content access subsystem of FIG. 3 implemented thereon according to principles described herein.

Access subsystem 104 and/or one or more components of access subsystem 104 may be implemented as may suit a particular implementation. FIG. 4 illustrates an exemplary media content access device 400 (or simply "device 400") having access subsystem 104 implemented thereon. Device 400 may include one or more of the components of access subsystem 104 shown in FIG. 3 and may be configured to perform one or more of the processes and/or operations described herein. Device 400 may include, but is not limited to, a set-top box device, a digital video recorder ("DVR") device, a multi-room DVR device, a media content processing device, a communications device, a mobile device (e.g., a mobile phone device), a handheld device, a personal computer, a phone device, a personal-digital assistant device, a gaming device, a television device, and/or any device configured to perform one or more of the processes and/or operations described herein.

As shown in FIG. 4, device 400 may include a communication interface 402 configured to receive media content and/or data (e.g., metadata, program guide data, and/or any other data associated with media content) in any acceptable format from delivery subsystem 102 or from any other suitable external source. Communication interface 402 may include any device, logic, and/or other technologies suitable for receiving signals and/or data representative of media content and/or other types of media content or data. Communication interface 402 may be configured to interface with any suitable communication media, protocols, and formats, including any of those mentioned above.

Device 400 may include a receiver 404 configured to receive user input signals from a user input device 406. User input device 406 may include, for example, a remote control device or any other suitable input device and may be configured to communicate with receiver 404 via a wireless link, electrical connection, or any other suitable communication link.

Device 400 may include a graphics engine 408 and an output driver 410. Graphics engine 408 may be configured to generate graphics to be provided to output driver 410, which may be configured to interface with or drive a display 412. Output driver 410 may provide output signals to display 412, the output signals including graphical media content (e.g., media content and/or program guide media content) generated by graphics engine 408 and to be presented by display 412 for experiencing by a user. For example, output driver 410 may provide data representative of a graphical user interface ("GUI") including a program guide view, a media playback view, or a media content recording listing view to display 412 for presentation to the user. Graphics engine 408 and output driver 410 may include any combination of hardware, software, and/or firmware as may serve a particular implementation.

Data store 414 may include one or more data storage media, devices, or configurations and may employ any type, form, and combination of storage media. For example, data store 414 may include, but is not limited to, a hard drive, network drive, flash drive, magnetic disc, optical disc, or other non-volatile storage unit. Media content and/or data associated with media content may be temporarily and/or permanently stored in data store 414.

Data store 414 is shown to be included within device 400 in FIG. 4 for illustrative purposes only. It will be understood that data store 414 may additionally or alternatively be located external to device 400.

Data store 414 may include one or more live cache buffers 416 (or simply "buffers 416"). Live cache buffer 416 may additionally or alternatively reside in memory 418 or in a storage device external to device 400. In some examples, media content data may be temporarily stored in live cache buffer 416 to facilitate playback of media content, pausing of playback of media content, time-shifted playback of media content, recording of media content, and/or presentation of media content in one or more trick play modes.

Device 400 may include memory 418. Memory 418 may include, but is not limited to, FLASH memory, random access memory ("RAM"), dynamic RAM ("DRAM"), other suitable computer-readable media, or any combination or subcombination thereof. In some examples, one or more applications 420 configured to run on or otherwise be executed by device 400 may reside in memory 418.

Device 400 may include one or more tuners 422. Tuner 422 may be configured to selectively receive media content carried on a particular media content carrier channel such that the media content may be processed by device 400. In some examples, media content received by tuner 422 may be temporarily buffered, or stored, in buffer 416. If there are multiple tuners 422, there may be a buffer 416 corresponding to each of the multiple tuners 422.

While tuner 422 may be used to receive certain media content-carrying signals transmitted by provider subsystem 102, device 400 may be configured to receive other types of media content signals (including media content signals and/or program guide data signals) from delivery subsystem 102 and/or one or more other sources without using a tuner. For example, delivery subsystem 102 may transmit digital streams of data packets (e.g., Internet Protocol ("IP") based data packets) that can be received without using a tuner. For such types of media content signals, communication interface 402 may receive and forward the signals directly to other components of device 400 (e.g., live cache buffer 416, processor 424, and/or signal processing unit 426) without the signals going through tuner 422. For an IP-based signal, for example, signal processing unit 426 may function as an IP receiver.

Device 400 may include at least one processor, such as processor 424, configured to control and/or perform one or more operations of device 400. Device 400 may also include a signal processing unit 426 configured to process incoming media content. Signal processing unit 426 may be configured, for example, to demodulate and parse encoded digital media content. In some examples, device 400 may include one or more signal processing units 426 corresponding to each of tuners 422.

Figure 5:
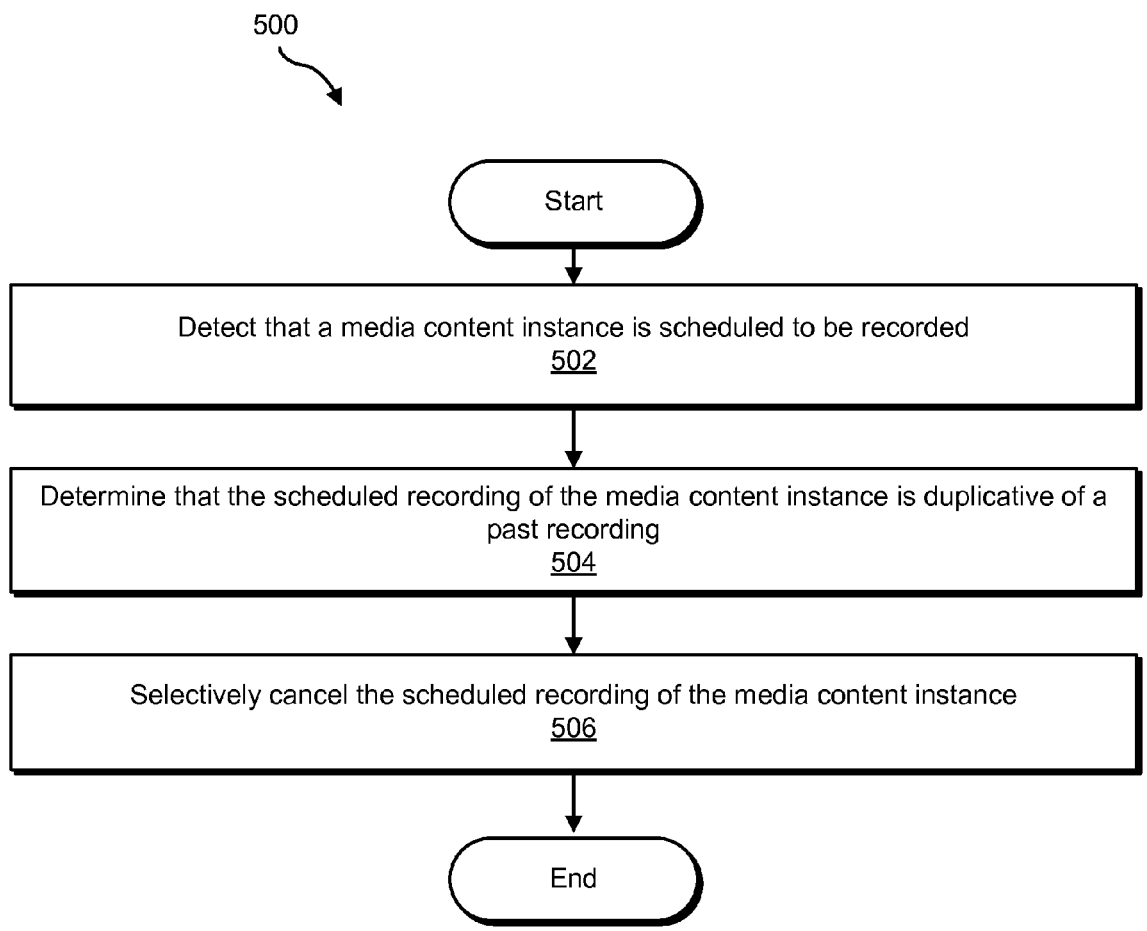
FIG. 5 illustrates an exemplary method of preventing duplicative media content recordings according to principles described herein.

FIG. 5 illustrates an exemplary method 500 of preventing duplicative media content recordings according to principles disclosed herein. While FIG. 5 illustrates exemplary steps according to one embodiment, other embodiments may omit, add to, reorder, and/or modify any of the steps shown in FIG. 5. The steps shown in FIG. 5 may be performed by any component or combination of components of access subsystem 104.

In step 502, a scheduled recording of a media content instance is detected. The scheduled recording of the media content instance may be detected in any suitable manner. For example, detection facility 302 may be configured to detect the scheduled recording. In some examples, detection facility 302 may be configured to detect the presence of the scheduled recording within a listing of scheduled recordings to be performed by access subsystem 104.

In step 504, the scheduled recording of the media content instance is determined to be duplicative of a past recording. The determination may be made in any suitable manner. For example, determination facility 304 may be configured to determine that the scheduled recording is duplicative based on an operations log of one or more past operations of access subsystem 104.

FIG. 6 illustrates an exemplary operations log 600 of access subsystem 104 according to principles disclosed herein. As shown, operations log 600 may include a plurality of log entries 602 for a plurality of past operations of access subsystem 104. Each log entry 602 may identify a particular operation of access subsystem 104, an associated media content program (e.g., by a title, by a season number, by an episode name/number, and/or by a unique program identification number), a date of the operation, and/or a time of the operation. In certain examples, each log entry 602 may also identify a type of recording (e.g., manual or automatic) associated with the operation as shown in FIG. 6.

In some examples, access subsystem 104 may maintain operations log 600 locally on access subsystem 104. For example, access subsystem 104 implemented by device 400 may maintain operations log 600 within data store 414. Accordingly, determination facility 304 may communicate with data store 414 to search and/or analyze operations log 600 to determine whether a scheduled recording is duplicative of a past recording.

Additionally or alternatively, access subsystem 104 may maintain operations log 600 remotely from access subsystem 104. For example, access subsystem 104 implemented by device 400 may maintain operations log 600 on a remote server. In some examples, access subsystem 104 may be configured to transmit data representative of operations log 600, including log entries 602, to the remote server for remote storage. Accordingly, determination facility 304 may be configured to communicate with the remote server to search and/or analyze operations log 600 to determine whether a scheduled recording is duplicative of a past recording.

Determination facility 304 may be configured to determine whether a scheduled recording is duplicative of a past recording based on operations log 600 in any suitable manner. For example, determination facility 304 may be configured to search operations log 600 for one or more operations and/or types of operations (e.g., record, delete, and/or playback operations) associated with the media content instance that is scheduled to be recorded.

To illustrate, if the scheduled recording is for Episode 6 of Season 3 of a television program known as "MacGyver," determination facility 304 may be configured to search operations log 600 for at least one operation associated with Episode 6 of Season 3 of "MacGyver." In certain embodiments, determination facility 304 may search operations log 600 for program identification information (e.g., title, episode, season, program identification number, etc.) that matches program identification information associated with the scheduled recording. In searching operations log 600, determination facility 304 may detect that Episode 6 of Season 3 of "MacGyver" was recorded by access subsystem 104 on January $19^{th}$ ("1/19"), played back on January $21^{st}$ ("1/21"), and deleted on January $21^{st}$ ("1/21"). In response to detecting any or all of the operations associated with Episode 6 of Season 3 of "MacGyver," determination facility 304 may determine that the scheduled recording of Episode 6 of Season 3 of "MacGyver" is duplicative of a past recording. Determination facility 304 may be configured to determine that the scheduled recording is duplicative of a past recording in any other suitable manner.

As used herein, the term "duplicative," "duplicative recording," or "duplicative scheduled recording" shall refer to a recording or scheduled recording that is determined to be duplicative of a past recording in accordance with a duplicative recording heuristic. The duplicative recording heuristic may be defined to specify a particular set of duplication conditions to be considered and/or found for a scheduled recording to be deemed duplicative. For example, the duplicative recording heuristic may specify which data sets (e.g., an operations log, a listing of currently available recordings, a listing of recently deleted recordings, or a combination or sub-combination thereof) to search and what types of data (e.g., what types of operations) to search for within the data sets to determine that a scheduled recording is duplicative of a past recording. The data sets and/or types of data specified by the duplicative recording heuristic may be configured to indicate that a user has likely already experienced a media content instance scheduled to be recorded. To illustrate, the duplicative recording heuristic may specify that an operations log is to be searched for a playback operation associated with the media content instance, thereby indicating that the user has likely already recorded and then played back the media content instance. In additional or alternative examples, the duplicative recording heuristic may specify a condition that one or more user-configurable parameters be considered and/or found for a scheduled recording to be deemed duplicative. For example, a user may be allowed to set one or more user-configurable parameters to indicate which data sets to search and what types of data (e.g., what operations or combinations of operations) to search for within the data sets to determine if a scheduled recording is duplicative. The duplicative recording heuristic may specify any other suitable duplication conditions as may serve a particular implementation.

Returning to FIG. 5, in step 506, the scheduled recording of the media content instance is selectively canceled. Access subsystem 104 may be configured to selectively cancel the scheduled recording in any suitable manner. For example, selective cancelation facility 306 may be configured to selectively cancel the scheduled recording in accordance with a cancelation heuristic. The cancelation heuristic may be defined to specify one or more cancelation conditions to be considered and/or found before a duplicative scheduled recording is canceled.

For example, the cancelation heuristic may specify a cancelation condition associated with a type of recording of the scheduled recording. To illustrate, selective cancelation facility 306 may be configured to selectively cancel a scheduled recording based on whether the scheduled recording is a manual recording or an automatic recording. If the scheduled recording is a manual recording (which may tend to indicate that the user likely is aware of the particular media content instance to be recorded and desires to record the media content instance despite its duplicative nature), selective cancelation facility 306 may be configured to preserve (e.g., by keeping the scheduled recording in a recording schedule) the scheduled recording. In contrast, if the scheduled recording is an automatic recording (which may tend to indicate that the user likely may not be aware of the particular media content instance to be recorded or of its duplicative nature), selective cancelation facility 306 may be configured to cancel the scheduled recording (e.g., by removing the scheduled recording from a recording schedule).

Figure 7:
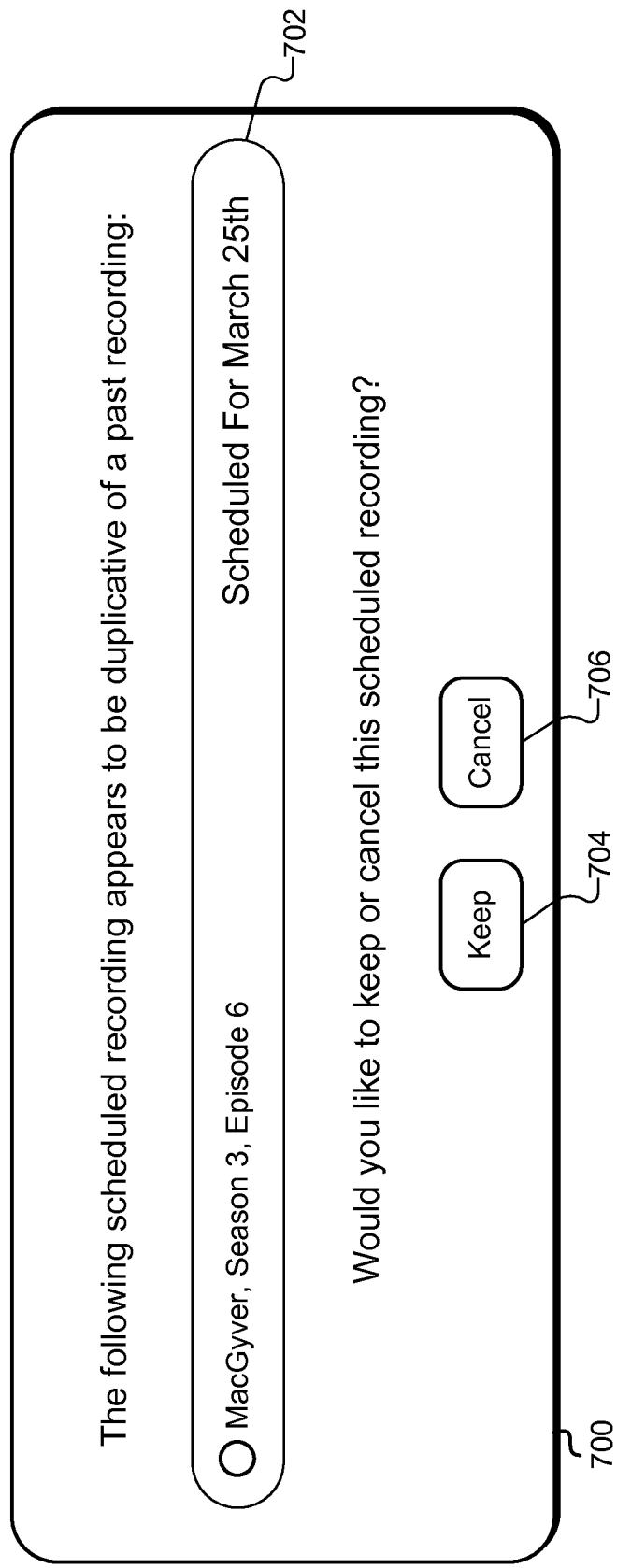
FIG. 7 illustrates an exemplary notification to a user of a duplicative media content recording according to principles described herein.

In additional or alternative examples, the cancelation heuristic may specify a cancelation condition requiring user input prior to the cancelation of a duplicative scheduled recording. For example, FIG. 7 illustrates an exemplary notification 700 that may be provided to an end user to prompt the user for an input command to indicate whether to cancel a scheduled recording 702 (e.g., a scheduled recording of Episode 6 of Season 3 of "MacGyver" on March $25^{th}$). In response to a determination that scheduled recording 702 is duplicative of a past recording, access subsystem 104 may provide notification 700 to the user to allow the user to determine whether to cancel scheduled recording 702. As shown, notification 700 may include a statement that "The following scheduled recording appears to be duplicative of a past recording," and a question of "Would you like to keep or cancel the scheduled recording?" Additionally or alternatively, notification 700 may include one or more selectable options 704 and 706 configured to allow a user to select to "Keep" or "Cancel" scheduled recording 702. In response to a user selection of selectable option 704, selective cancelation facility 306 may keep the scheduled recording. In response to a user selection of option 706, selective cancelation facility 306 may cancel the scheduled recording.

Notification 700 is provided for illustrative purposes only and is not limiting. Access subsystem 104 may additionally or alternatively be configured to receive user input and selectively cancel a duplicative scheduled recording in accordance with the user input in any other suitable manner.

Figure 8:
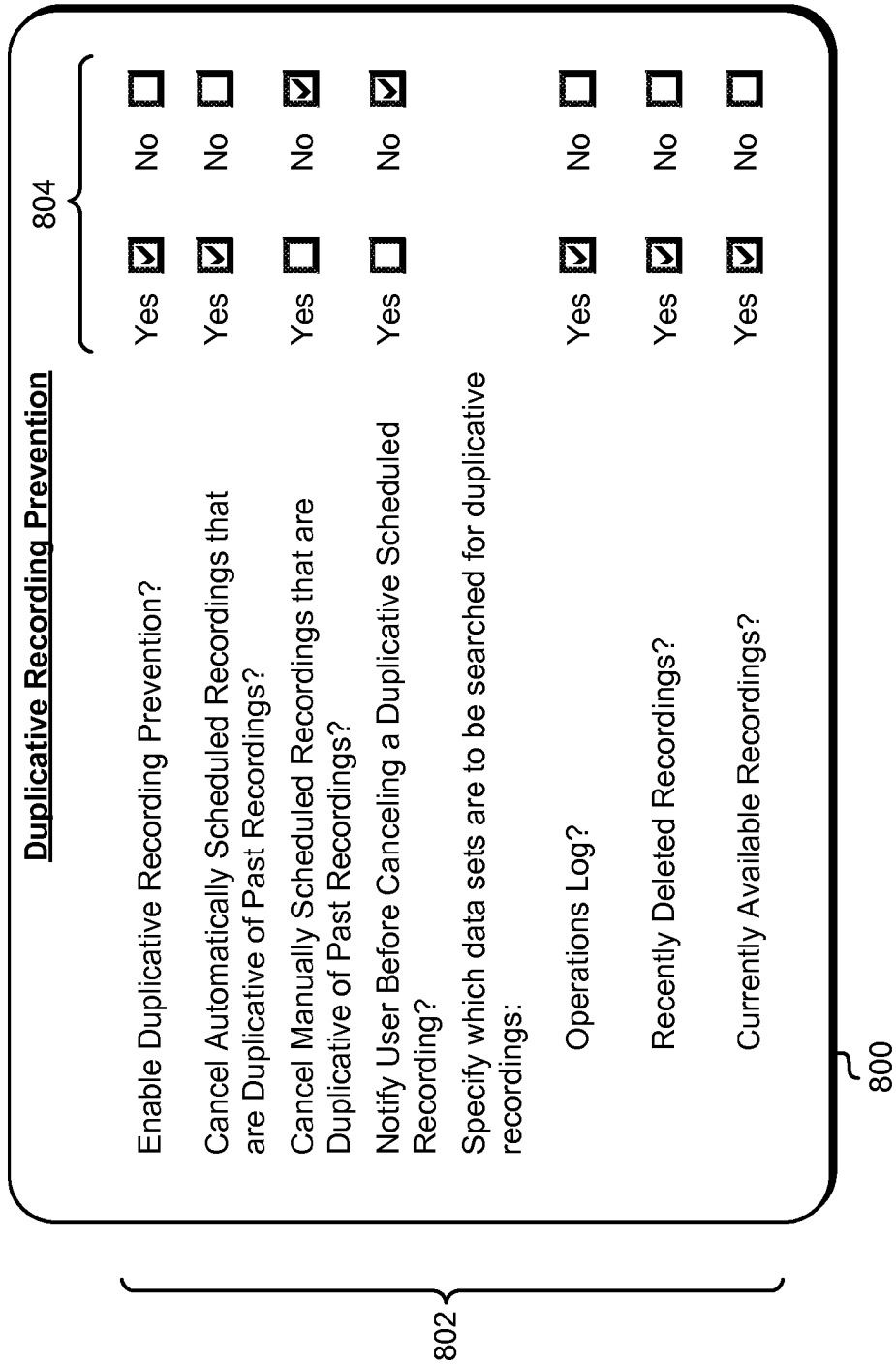
FIG. 8 illustrates an exemplary graphical user interface ("GUI") configured to facilitate a user's selection of one or more user-configurable parameters according to principles described herein.

In some examples, a cancelation heuristic may specify a condition that duplicative scheduled recordings be canceled in accordance with one or more user-configurable parameters. For example, as shown in FIG. 8, access subsystem 104 may provide a GUI 800 configured to facilitate user selection of one or more user-configurable parameters to an end-user. GUI 800 may include a plurality of user-configurable parameters 802, each associated with one or more selectable options 804. Selectable options 804 may be configured to allow a user to set user-configurable parameters 802 as desired. For example, a user may use selectable options 804 to indicate whether access subsystem 104 will enable duplicative recording prevention, cancel automatic recordings that are duplicative of past recordings, cancel manual recordings that are duplicative of past recordings, and/or notify the user before canceling a duplicative recording. Additionally or alternatively, a user may use selectable options 804 to indicate which sets of data (e.g., an operations log, a listing of recently deleted recordings, and/or a listing of currently available recordings) are to be searched by access subsystem 104 to determine if a scheduled recording is duplicative of a past recording. After receiving a user's selections, selective cancelation facility 306 may selectively cancel duplicative scheduled recordings in accordance with the selections provided by the user by way of GUI 800.

The above examples are provided for illustrative purposes only. In additional or alternative examples, access subsystem 104 may be configured to selectively cancel duplicative scheduled recordings in accordance with any other suitable cancelation conditions defined by a cancelation heuristic.

Figure 9:
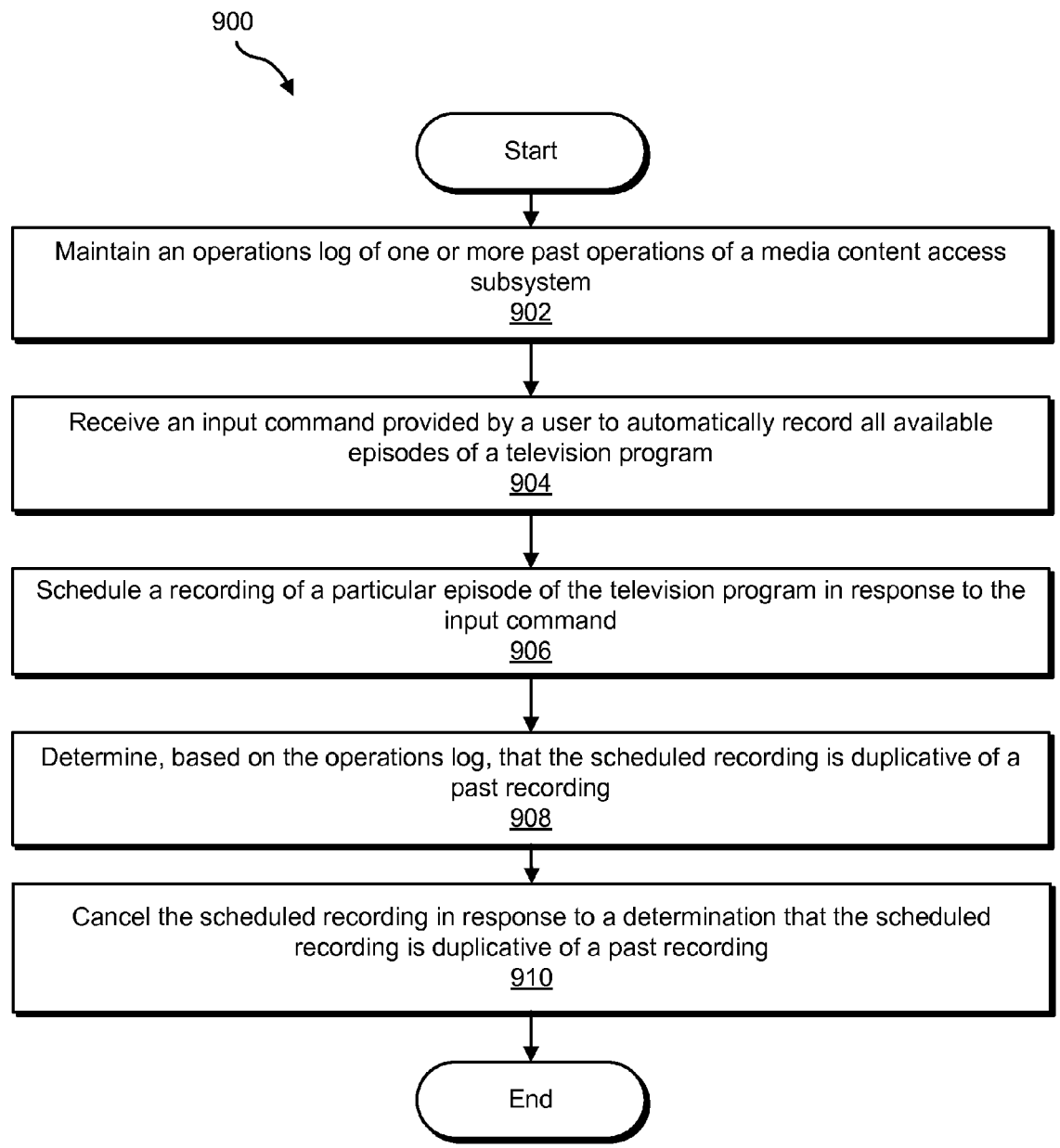
FIG. 9 illustrates another exemplary method of preventing duplicative media content recordings according to principles described herein.

FIG. 9 illustrates another exemplary method 900 of preventing duplicative media content recordings. While FIG. 9 illustrates exemplary steps according to one embodiment, other embodiments may omit, add to, reorder, and/or modify any of the steps shown in FIG. 9. The steps shown in FIG. 9 may be formed by any component or combination of components of access subsystem 104.

In step 902, an operations log of one or more past operations of a media content access subsystem is maintained. Access subsystem 104 may maintain the operations log in any suitable manner, such as is described herein. For example, storage facility 308 may be configured to maintain data representative of operations log 600.

In step 904, an input command provided by a user to automatically record all available episodes of a television program is received. For example, a user may wish to automatically record all available episodes of her favorite television program. Accordingly, the user may provide a corresponding input command (e.g., using user input device 406) to access subsystem 104.

In step 906, a recording of a particular episode of the television program is scheduled in response to the input command. For example, in response to the input command provided by the user, access subsystem 104 may schedule a recording of a particular episode that will be made available to access subsystem 104 (e.g., by delivery subsystem 102) at a particular scheduled transmission time. Access subsystem 104 may schedule the recording of the particular episode in any suitable manner.

In step 908, the scheduled recording is determined, based on the operations log, to be duplicative of a past recording. Access subsystem 104 may be configured to determine that the scheduled recording is duplicative of a past recording in any suitable manner, such as described herein.

In step 910, the scheduled recording is canceled in response to a determination that the scheduled recording is duplicative of a past recording. Access subsystem 104 may be configured to cancel the scheduled recording in any suitable manner, such as described herein.

Figure 10:
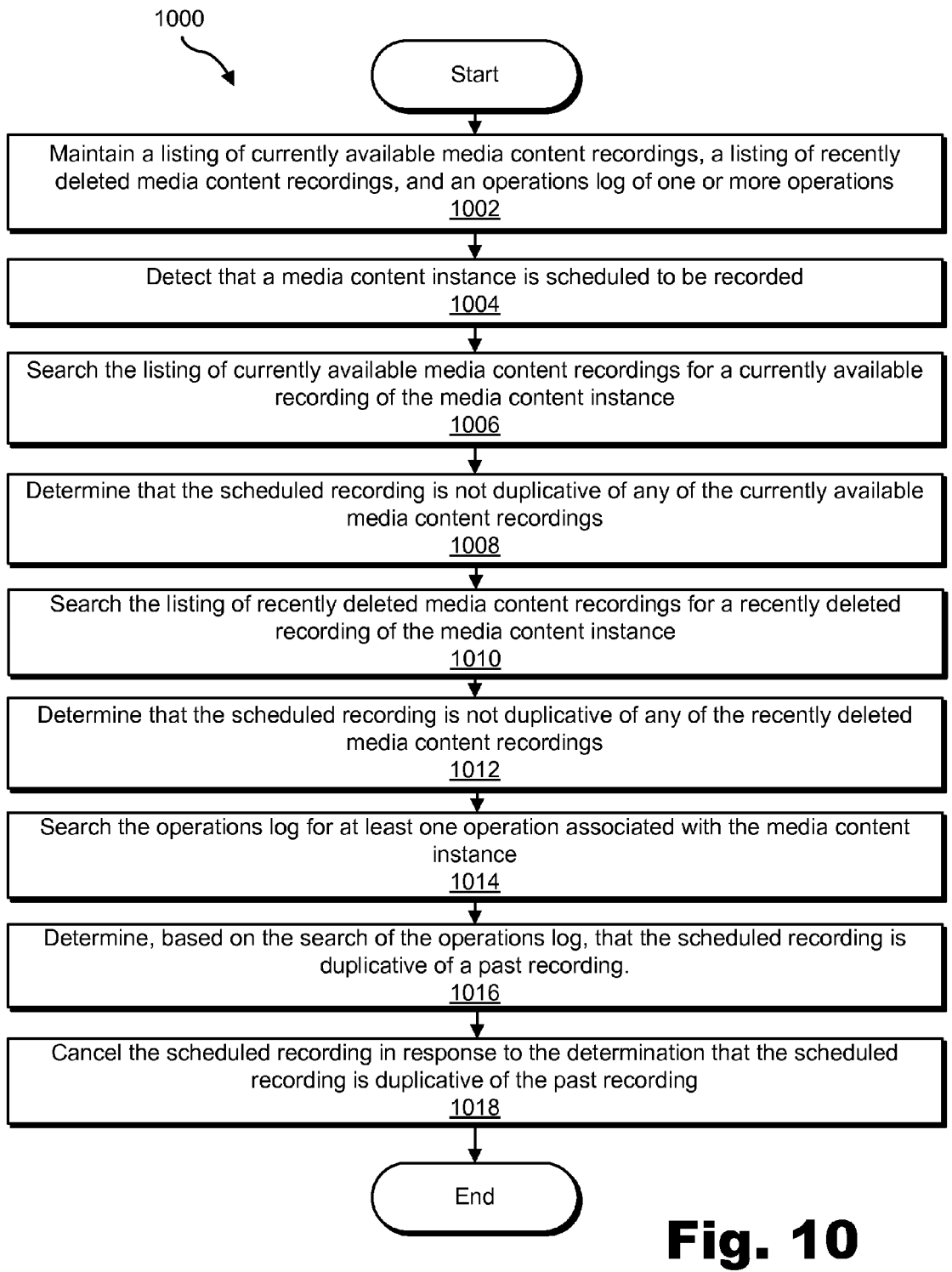
FIG. 10 illustrates yet another exemplary method of preventing duplicative media content recordings according to principles described herein.

FIG. 10 illustrates yet another exemplary method 1000 of preventing duplicative media content recordings. While FIG. 10 illustrates exemplary steps according to one embodiment, other embodiments may omit, add to, reorder, and/or modify any of the steps shown in FIG. 10. The steps shown in FIG. 10 may be performed by any component or combination of components of access subsystem 104.

In step 1002, a listing of currently available media content recordings, a listing of recently deleted media content recordings, and an operations log of one or more operations are maintained. Access subsystem 104 may maintain the listing of currently available media content recordings, the listing of recently deleted media content recordings, and the operations log in any suitable manner, such as described herein. For example, as discussed above and illustrated in FIG. 6, access subsystem 104 may be configured to maintain operations log 600.

Figure 11:
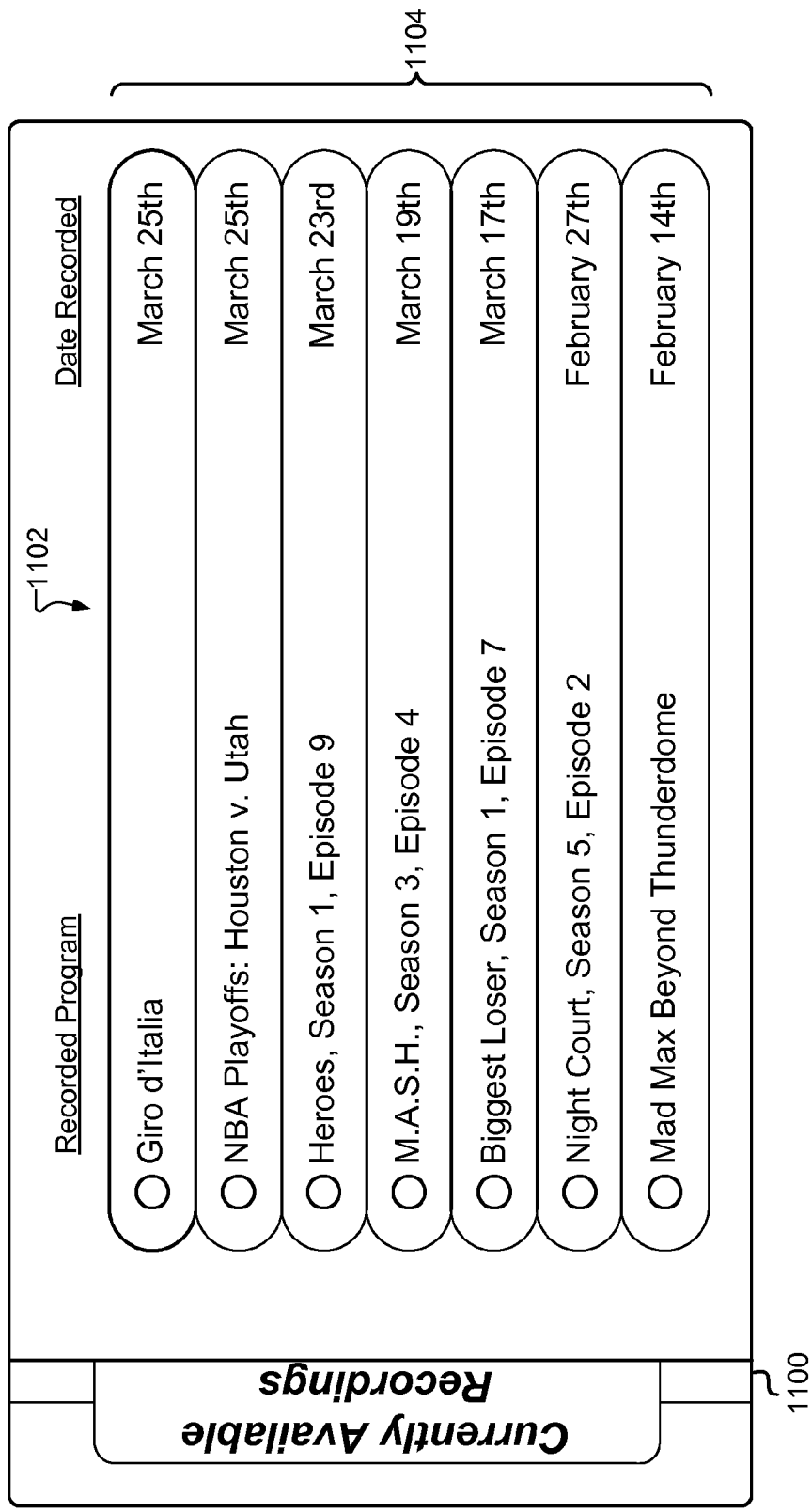
FIG. 11 illustrates an exemplary GUI including a listing of currently available media content recordings according to principles described herein.

As a further example, FIG. 11 illustrates an exemplary graphical user interface ("GUI") 1100 including a listing 1102 of currently available media content recordings 1104 (or simply "currently available recordings 1104"). As shown, listing 1102 may include information identifying the media content instances (e.g., the television programs) and recording dates associated with each currently available recording 1104. Listing 1102 may include any additional recordings and/or information as may be suitable for a particular implementation. Access subsystem 104 may maintain listing 1102 in any suitable manner. For example, storage facility 308 may be configured to maintain data representative of listing 1102.

Figure 12:
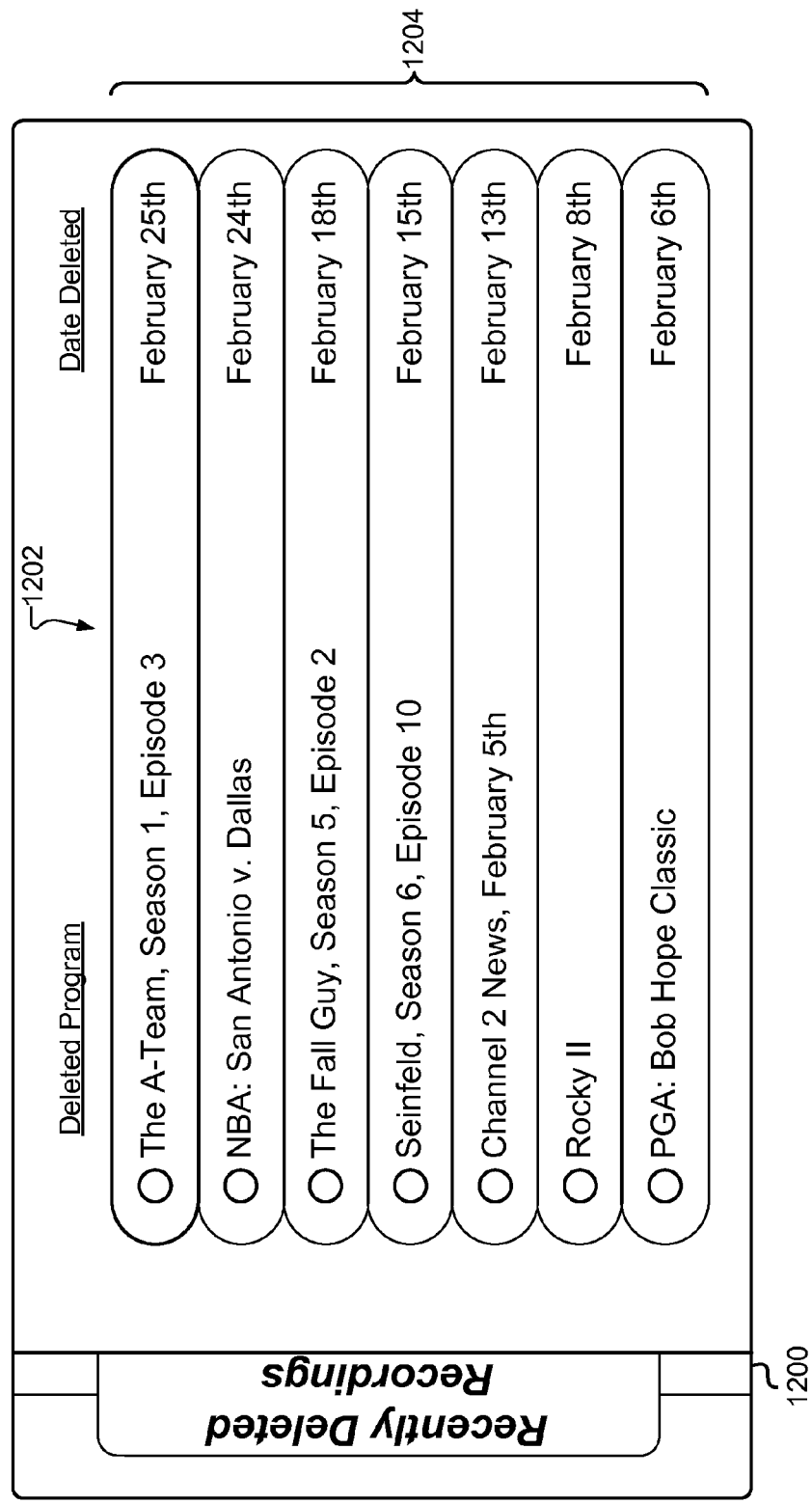
FIG. 12 illustrates an exemplary GUI including a listing of recently deleted media content recordings according to principles described herein.

FIG. 12 illustrates an exemplary graphical user interface ("GUI") 1200 including a listing 1202 of recently deleted media content recordings 1204 (or simply "recently deleted recordings 1204"). As shown, listing 1202 may include information identifying the media content instance (e.g., the television program) and deletion date associated with each recently deleted recording 1204. Listing 1202 may include any additional recordings and/or information as may be suitable for a particular implementation. Access subsystem 104 may maintain listing 1202 in any suitable manner. For example, storage facility 308 may be configured to maintain data representative of listing 1202.

Returning to FIG. 10, in step 1004, a scheduled recording of a media content instance is detected. Access subsystem 104 may be configured to detect the scheduled recording of the media content instance in any suitable manner, such as described herein.

In step 1006, the listing of currently available media content recordings is searched for a currently available recording of the media content instance. For example, access subsystem 104 may be configured to search listing 1102 of currently available recordings 1104 shown in FIG. 11 for a currently available recording 1104 of the media content instance scheduled to be recorded. In some examples, access subsystem 104 may be configured to search listing 1102 for program identification information that matches program identification information associated with the scheduled recording.

In step 1008, the scheduled recording is determined to not be duplicative of any of the currently available media content recordings. For example, upon searching listing 1102, access subsystem 104 may determine that the media content instance scheduled to be recorded is not present among currently available recordings 1104. To illustrate, if Episode 7 of Season 1 of "Seinfeld" is the media content instance scheduled to be recorded, access subsystem 104 may search listing 1102 and determine, based on the search, that the scheduled recording of Episode 7 of Season 1 of "Seinfeld" is not duplicative of any of currently available recordings 1104 (i.e., there is no currently available recording of Episode 7 of Season 1 of "Seinfeld").

In step 1010, the listing of recently deleted media content recordings is searched for a recently deleted recording of the media content instance. For example, access subsystem 104 may be configured to search listing 1202 of recently deleted recordings 1204 shown in FIG. 12 for a recently deleted recording of the media content instance in any suitable manner, such as described herein.

In step 1012, the scheduled recording is determined to not be duplicative of any of the recently deleted media content recordings. For example, upon searching listing 1202, access subsystem 104 may determine that the media content instance scheduled to be recorded is not present among the recently deleted recordings 1204. To illustrate, if Episode 7 of Season 1 of "Seinfeld" is the media content instance scheduled to be recorded, access subsystem 104 may search listing 1202 and determine, based on the search, that the scheduled recording of Episode 7 of Season 1 of "Seinfeld" is not duplicative of any of recently deleted recordings 1204 (i.e., there is no recently deleted recording of Episode 7 of Season 1 of "Seinfeld").

In step 1014, the operations log is searched for at least one operation associated with the media content instance. For example, access subsystem 104 may be configured to search operations log 600 shown in FIG. 6 for at least one operation associated with the media content instance scheduled to be recorded.

In step 1016, a determination is made based on the search of the operations log that the scheduled recording is duplicative of a past recording. For example, upon searching operations log 600, access subsystem 104 may determine that the media content instance scheduled to be recorded was previously recorded, played back, or deleted by access subsystem 104. To illustrate, if Episode 7 of Season 1 of "Seinfeld" is the media content instance scheduled to be recorded, access subsystem 104 may search operations log 600 and detect one or more operations associated with Episode 7 of Season 1 of "Seinfeld." For example, access subsystem 104 may detect that Episode 7 of Season 1 of "Seinfeld" was played back and deleted by access subsystem 104 on 1/17. In response to the detected operations associated with Episode 7 of Season 1 of "Seinfeld," access subsystem 104 may determine that the scheduled recording of Episode 7 of Season 1 of "Seinfeld" is duplicative of a past recording.

In step 1018, the scheduled recording is canceled in response to the determination that the scheduled recording is duplicative of the past recording. Access subsystem 104 may be configured to cancel the scheduled recording in any suitable manner, such as described herein.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied in a non-transitory computer-readable medium, or combinations of computer-implemented instructions and hardware, configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 13:
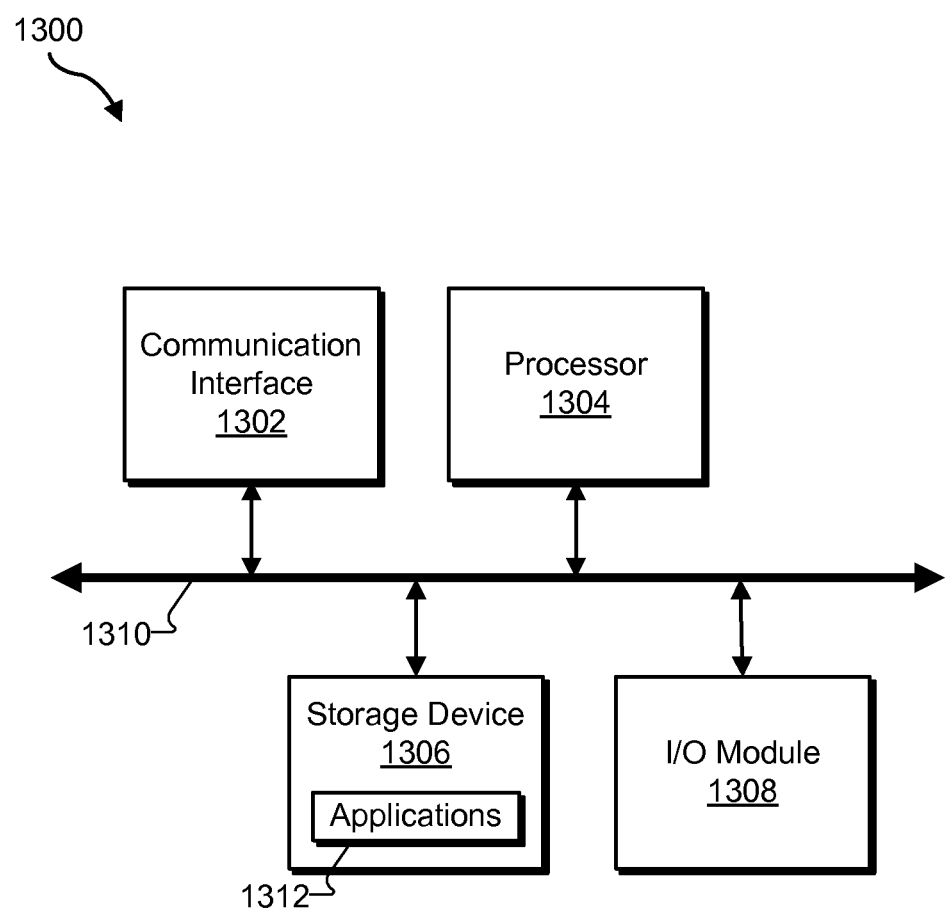
FIG. 13 illustrates an exemplary computing device according to principles described herein.

FIG. 13 illustrates an exemplary computing device 1300 that may be configured to perform one or more of the processes described herein. As shown in FIG. 13, computing device 1300 may include a communication interface 1302, a processor 1304, a storage device 1306, and an input/output ("I/O") module 1308 communicatively connected via a communication infrastructure 1310. While an exemplary computing device 1300 is shown in FIG. 13, the components illustrated in FIG. 13 are not intended to be limiting. Additional or alternative components may be used in other embodiments. Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a modem, and any other suitable interface. In at least one embodiment, communication interface 1302 may provide a direct connection between system 100 and one or more of provisioning systems via a direct link to a network, such as the Internet. Communication interface 1302 may additionally or alternatively provide such a connection through, for example, a local area network (such as an Ethernet network), a personal area network, a telephone or cable network, a satellite data connection, a dedicated URL, or any other suitable connection. Communication interface 1302 may be configured to interface with any suitable communication media, protocols, and formats, including any of those mentioned above.

Processor 1304 generally represents any type or form of processing unit capable of processing data or interpreting, executing, and/or directing execution of one or more of the instructions, processes, and/or operations described herein. Processor 1304 may direct execution of operations in accordance with one or more applications 1312 or other computer-executable instructions such as may be stored in storage device 1306 or another computer-readable medium.

Storage device 1306 may include one or more data storage media, devices, or configurations and may employ any type, form, and combination of data storage media and/or device. For example, storage device 1306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1306. For example, data representative of one or more executable applications 1312 (which may include, but are not limited to, one or more of the software applications described herein) configured to direct processor 1304 to perform any of the operations described herein may be stored within storage device 1306. In some examples, data may be arranged in one or more databases residing within storage device 1306.

I/O module 1308 may be configured to receive user input and provide user output and may include any hardware, firmware, software, or combination thereof supportive of input and output capabilities. For example, I/O module 1308 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1308 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1308 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1300. For example, one or more applications 1312 residing within storage device 1306 may be configured to direct processor 1304 to perform one or more processes or functions associated with media content facility 202, communication facility 204, detection facility 302, determination facility 304, and/or selective cancelation facility 306. Likewise, storage facility 206 and/or storage facility 308 may be implemented by or within storage device 1306.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A computer-implemented method comprising:
   receiving, by a media content access subsystem, a user input command to record a media content instance;
   scheduling, by the media content access subsystem in response to the user input command, a recording of the media content instance;
   determining, by the media content access subsystem, whether the user input command is a user input command to record a particular transmission of the media content instance or a user input command to automatically record any available media content instances in a series of related media content instances including the media content instance;
   determining, by the media content access subsystem based on an operations log of one or more past operations of the media content access subsystem, that the scheduled recording of the media content instance is duplicative of a past recording; and
   selectively canceling, by the media content access subsystem in response to the determining that the scheduled recording of the media content instance is duplicative of the past recording and in accordance with a cancelation heuristic, the scheduled recording of the media content instance,
   wherein the cancelation heuristic specifies a cancelation condition based on whether the user input command is determined to be the user input command to record the particular transmission of the media content instance or the user input command to automatically record all or any available media content instances in the series of related media content instances including the media content instance.

2. The computer-implemented method of claim 1, wherein the determining that the scheduled recording of the media content instance is duplicative of the past recording comprises:
   searching the operations log for at least one operation associated with the media content instance; and
   detecting the at least one operation associated with the media content instance within the operations log.

3. The computer-implemented method of claim 2, wherein the at least one operation associated with the media content instance comprises at least one of a recording of the media content instance, a playback of a recording of the media content instance, and a deletion of a recording of the media content instance.

4. The computer-implemented method of claim 1, further comprising maintaining, by the media content access subsystem, the operations log locally at the media content access subsystem.

5. The computer-implemented method of claim 1, further comprising maintaining, by the media content access subsystem, the operations log remotely of the media content access subsystem.

6. The computer-implemented method of claim 1, further comprising prompting, by the media content access subsystem in response to the determining that the scheduled recording of the media content instance is duplicative of the past recording, a user for another input command to indicate whether to cancel the scheduled recording.

7. The computer-implemented method of claim 1, wherein the selectively canceling comprises canceling the scheduled recording in response to another input command received from the user to cancel the scheduled recording.

8. The computer-implemented method of claim 1, wherein the selectively canceling comprises preserving the scheduled recording in response to another input command received from the user to preserve the scheduled recording.

9. The computer-implemented method of claim 1, wherein the cancelation heuristic specifies canceling the scheduled recording in response to a determination that the user input command is the user input command to automatically record any available media content instances in the series of related media content instances including the media content instance.

10. The computer-implemented method of claim 1, wherein the cancelation heuristic specifies preserving the scheduled recording in response to a determination that the user input command is the user input command to record the particular transmission of the media content instance.

11. The computer-implemented method of claim 1, further comprising:
    providing, by the media content access subsystem, a graphical user interface including one or more user-configurable parameters for presentation to a user; and
    facilitating, by the media content access subsystem, a selection by the user of at least one user-configurable parameter included in the one or more user-configurable parameters by way of the graphical user interface.

12. The computer-implemented method of claim 11, wherein the cancelation heuristic is based at least in part on the selection by the user of the at least one user-configurable parameter.

13. The computer-implemented method of claim 1, embodied as computer-executable instructions on at least one non-transitory computer-readable medium.

14. A method comprising:
    maintaining, by a media content access subsystem, an operations log of one or more past operations of the media content access subsystem;
    receiving, by the media content access subsystem, an input command provided by a user to automatically record all available episodes of a television program;
    scheduling, by the media content access subsystem in response to the input command, a recording of a particular episode of the television program;
    determining, by the media content access subsystem, that the scheduled recording of the particular episode of the television program is based on the input command provided by the user to automatically record all available episodes of the television program;
    determining, by the media content access subsystem based on the operations log, that the scheduled recording of the particular episode of the television program is duplicative of a past recording; and
    canceling, by the media content access subsystem in response to the determination that the scheduled recording is duplicative of the past recording and in accordance with a cancelation heuristic, the scheduled recording of the particular episode of the television program,
    wherein the cancelation heuristic specifies canceling the scheduled recording of the particular episode in response to the determining that the scheduled recording is based on the input command provided by the user to automatically record all available episodes of the television program.

15. The method of claim 14, wherein the determining that the scheduled recording of the media content instance is duplicative of the past recording comprises:
    searching the operations log for at least one operation associated with the particular episode; and
    detecting the at least one operation associated with the particular episode within the operations log.

16. The method of claim 15, wherein the at least one operation associated with the particular episode comprises at least one of a recording of the particular episode, a playback of a recording of the particular episode, and a deletion of a recording of the particular episode.

17. A computer-implemented method comprising:
    maintaining, by a media content access subsystem, a listing of currently available media content recordings, a listing of recently deleted media content recordings, and an operations log of one or more operations of the media content access subsystem;
    detecting, by the media content access subsystem, that a media content instance is scheduled to be recorded;
    searching, by the media content access subsystem, the listing of currently available media content recordings for a currently available recording of the media content instance;
    determining, by the media content access subsystem based on the searching of the listing of currently available media content recordings, that the scheduled recording is not duplicative of any of the currently available media content recordings;
    searching, by the media content access subsystem, the listing of recently deleted media content recordings for a recently deleted recording of the media content instance;
    determining, by the media content access subsystem based on the searching of the listing of recently deleted media content recordings, that the scheduled recording is not duplicative of any of the recently deleted media content recordings;

searching, by the media content access subsystem, the operations log for at least one operation associated with the media content instance;

determining, by the media content access subsystem based on the searching of the operations log, that the scheduled recording is duplicative of a past recording; and canceling, by the media content access subsystem in response to the determining that the scheduled recording is duplicative of the past recording, the scheduled recording.

18. The computer-implemented method of claim 17, wherein the determining that the scheduled recording of the media content instance is duplicative of the past recording comprises detecting the at least one operation associated with the media content instance within the operations log.

19. A system comprising:

a detection facility configured to detect a user input command to record a media content instance and determine whether the user input command is a user input command to record a particular transmission of the media content instance or a user input command to automatically record any available media content instances in a series of related media content instances including the media content instance;

a determination facility communicatively coupled to the detection facility and configured to determine, based on an operations log of one or more past operations of the system, that the scheduled recording of the media content instance is duplicative of a past recording; and a selective cancelation facility communicatively coupled to the determination facility and configured to selectively cancel the scheduled recording of the media content instance in response to the determination by the determination facility that the scheduled recording is duplicative of the past recording and in accordance with a cancelation heuristic specifying a cancelation condition based on whether the user input command is determined to be the user input command to record the particular transmission of the media content instance or the user input command to automatically record any available media content instances in the series of related media content instances including the media content instance.

* * * * *